US012602385B2

(12) United States Patent
Wan et al.

(10) Patent No.: US 12,602,385 B2
(45) Date of Patent: Apr. 14, 2026

(54) CONTEXT-AWARE RELEVANCE MODELING IN CONVERSATIONAL SYSTEMS

(71) Applicant: INTERNATIONAL BUSINESS MACHINES CORPORATION, Armonk, NY (US)

(72) Inventors: Hui Wan, White Plains, NY (US); Xiaodong Cui, Chappaqua, NY (US); Songtao Lu, White Plains, NY (US); Marina Danilevsky Hailpern, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 18/453,127

(22) Filed: Aug. 21, 2023

(65) Prior Publication Data

US 2025/0068635 A1      Feb. 27, 2025

(51) Int. Cl.
G06F 16/2457 (2019.01)

(52) U.S. Cl.
CPC .............................. G06F 16/24575 (2019.01)

(58) Field of Classification Search
CPC ........... G06F 16/24575; G06F 16/3329; G06F 16/33295
USPC ....................................................... 707/722
See application file for complete search history.

(56) References Cited

U.S. PATENT DOCUMENTS

| | | |
|---|---|---|
| 10,509,829 B2 | 12/2019 | Rambhia |
| 10,565,279 B2 | 2/2020 | Reddy |

| | | | |
|---|---|---|---|
| 10,664,527 B1 * | 5/2020 | Henderson | .......... G06F 16/3347 |
| 11,379,529 B2 | 7/2022 | Fenton | |
| 11,449,556 B2 | 9/2022 | Jawagal | |
| 11,455,087 B2 | 9/2022 | Burke | |
| 11,971,914 B1 * | 4/2024 | Watson | ............... G06F 16/3347 |
| 2014/0229462 A1 * | 8/2014 | Lo | .......................... G06F 16/951 |
| | | | 707/707 |

(Continued)

FOREIGN PATENT DOCUMENTS

| | | |
|---|---|---|
| WO | 2025/040297 A1 | 2/2025 |

OTHER PUBLICATIONS

Alami Merrouni, et al., "Toward Contextual Information Retrieval: A Review and Trends", ScienceDirect, Procedia Computer Science 148 (2019) pp. 191-200, Elsevier, Second International Conference on Intelligent Computing in Data Sciences (ICDS 2018).

(Continued)

*Primary Examiner* — Michael Pham
(74) *Attorney, Agent, or Firm* — Lily Neff

(57)      ABSTRACT

A method, computer system, and a computer program product are provided for a context-aware relevancy modelling in conversational systems. A user query is received. A latent static content d is selected from a corpus of content D. A latent set of context C from a set of external context Cu is also selected. A result is generated using a scoring function and using the latent static content d from a corpus D and the latent set of context C from the set of external contexts CU so as to provide a most relevant context-base search response to said user query q. The result provides a most relevant context-base search response to said user query q. A response is then generated based on said result using said scoring function result to said user query q.

20 Claims, 3 Drawing Sheets

(56) References Cited

U.S. PATENT DOCUMENTS

| | | | | |
|---|---|---|---|---|
| 2016/0041991 A1* | 2/2016 | Sahuguet | ........... | G06F 16/3322 |
| | | | | 707/723 |
| 2018/0060325 A1* | 3/2018 | Taylor | ............... | G06F 16/24578 |
| 2021/0240776 A1* | 8/2021 | Jawagal | ................. | G06N 3/049 |
| 2023/0325603 A1* | 10/2023 | Galley | .................... | G06F 40/30 |
| | | | | 704/9 |
| 2024/0265041 A1* | 8/2024 | Rennie | ................ | G06F 16/3329 |

OTHER PUBLICATIONS

Feng, et al., "Learning Multi-Turn Response Selection in Grounded Dialogues with Reinforced Knowledge and Context Distillation," ACM Transactions on Information Systems, vol. 41, No. 4, Article 115, Apr. 2023, pp. 115-1 to 115-27.

Hua, et al., "Learning to Detect Relevant Context and Knowledge for Response Selection in Retrieval-Based Dialogue Systems," ACM, CIKM '20, Oct. 19-23, 2020, pp. 525-534.

Limbu, et al., "A Framework for Contextual Information Retrieval from the WWW", ResearchGate, ISCA 14th International Conference on Intelligent and Adaptive Systems and Software Engineering (IASSE-05), Toronto, Canada, Jan. 2005, 6 pgs., https://www.researchgate.net/publication/215635973_A_framework_for_contextual_information_retrieval_from_the_WWW.

Limbu, et al., "Improving Web Search Using Contextual Retrieval", arXiv: 1407.6101, Jul. 23, 2014, 7 pgs., https://arxiv.org/abs/1407.6101.

Friedman et al. "Leveraging Large Language Models in Conversational Recommender Systems", arXiv:2305.07961, May 16, 2023, 24 pages.

International Searching Authority, "Notification of Transmittal of the International Search Report and the Written Opinion of the International Searching Authority, or Declaration," Patent Cooperation Treaty, Nov. 11, 2024, 13 pages, International Application No. PCT/EP2024/068620.

Zhu et al. "Large Language Models for Information Retrieval: A Survey", arXiv:2308.07107, Sep. 4, 2024, 35 pages.

* cited by examiner

100

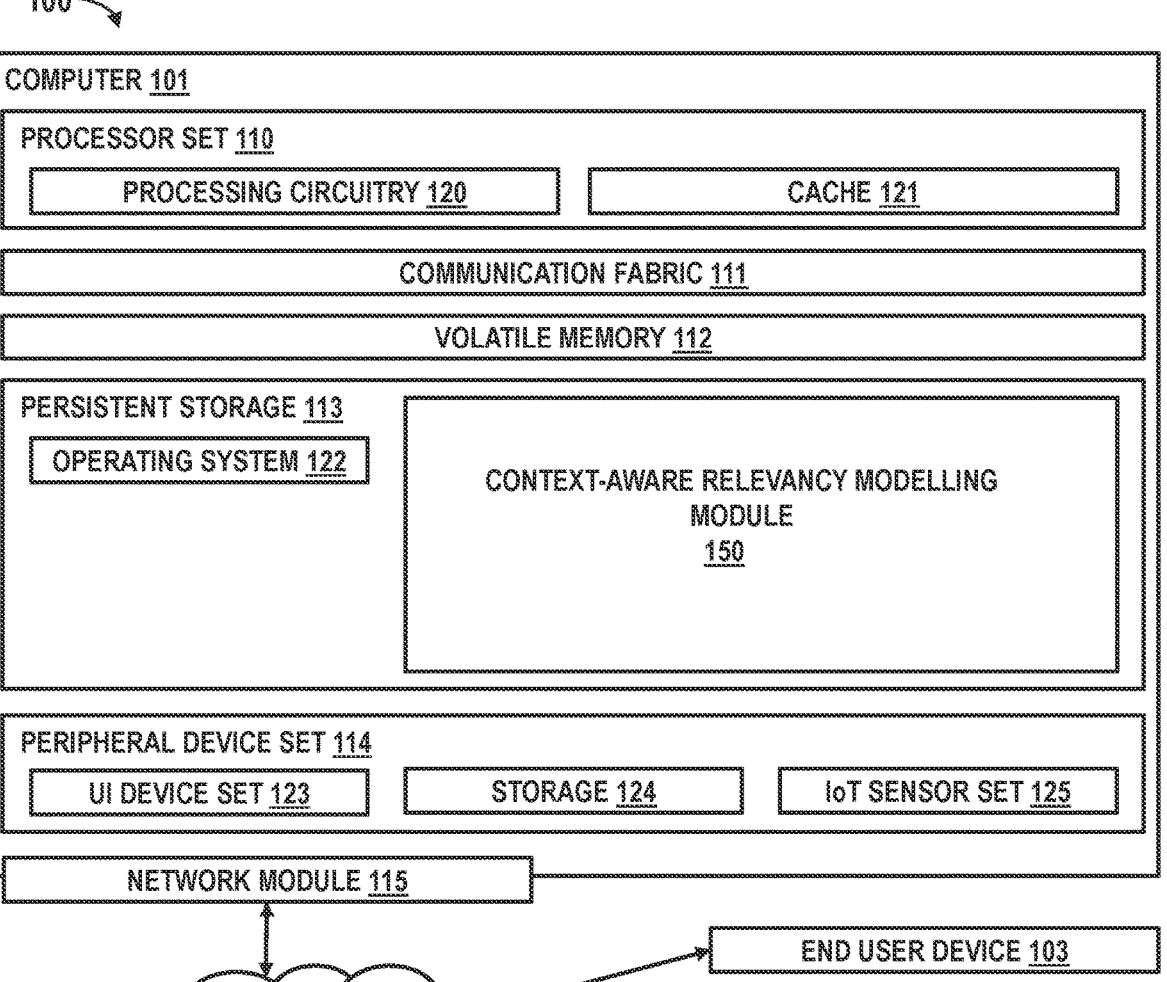

COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122

CONTEXT-AWARE RELEVANCY MODELLING MODULE 150

PERIPHERAL DEVICE SET 114

UI DEVICE SET 123        STORAGE 124        IoT SENSOR SET 125

NETWORK MODULE 115

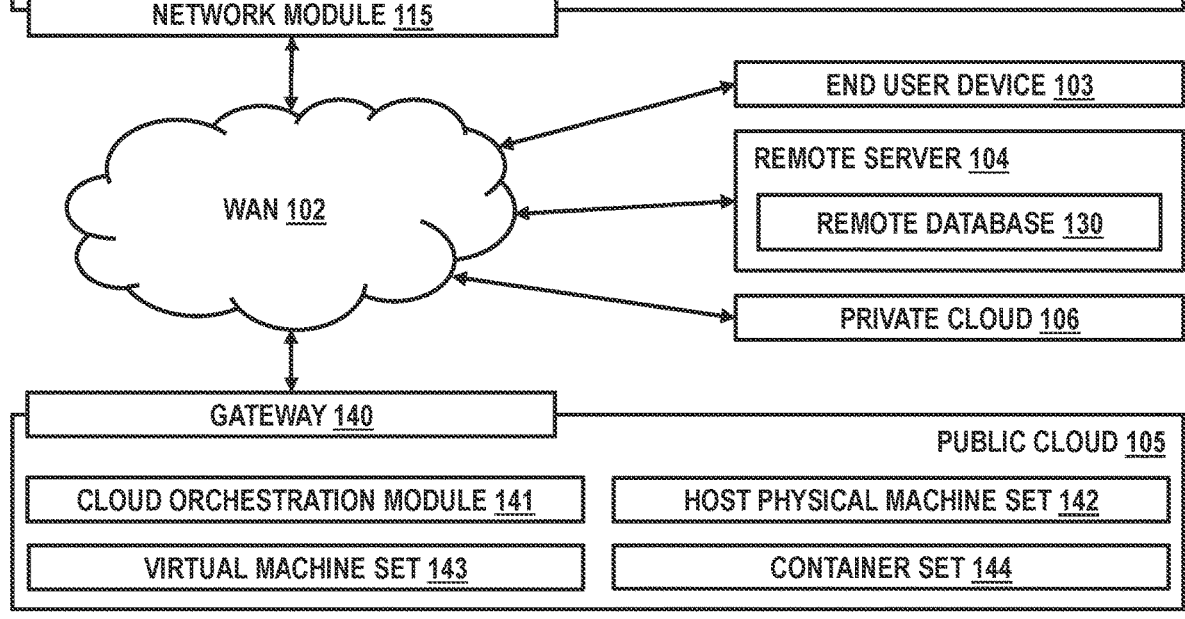

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141        HOST PHYSICAL MACHINE SET 142

VIRTUAL MACHINE SET 143        CONTAINER SET 144

FIG. 1

CONTEXT-AWARE RELEVANCE MODELING IN CONVERSATIONAL SYSTEMS

BACKGROUND

The present invention relates generally to the field of language modeling and more particularly to techniques for providing context-aware relevance modeling in conversational systems.

Large language models (LLM) represent a class of deep learning architecture that at times can be referenced as a transformer network or modeler. A transformer modeler is a type of neural network that learns context and meaning by tracking relationships using obtained data.

Recently, conversational systems have been based on LLM technology. Conversational systems based on LLM can also utilize Artificial Intelligence (AI) systems and use natural language processing to create humanlike conversational dialogues. The AI modelers can respond to questions and compose various written content, including documents, social media posts, essays code, articles and email.

Despite a rising interest globally in using conversational systems using LLM technology, designing such modeler systems has many challenges. One challenge has to do with the amount of external context. The amount of data and associating it with an appropriate context may become exhaustive when developing these models. Other factors further compound these challenges. For example, excessive noise can also affect and confuse the system and affect data integrity.

SUMMARY

Embodiments of the present invention disclose a method, computer system, and a computer program product for providing a context-aware relevancy modelling in conversational systems. A user query is received. A latent static content d is selected from a corpus of content D. A latent set of context C from a set of external context Cu is also selected. A result is generated using a scoring function and using the latent static content d from a corpus D and the latent set of context C from the set of external contexts CU so as to provide a most relevant context-base search response to said user query q. The result provides a most relevant context-base search response to said user query q. A response is then generated based on said result using said scoring function result to said user query q.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings:

FIG. 1 illustrates a networked computer environment, according to at least one embodiment;

DETAILED DESCRIPTION

Figure 2:
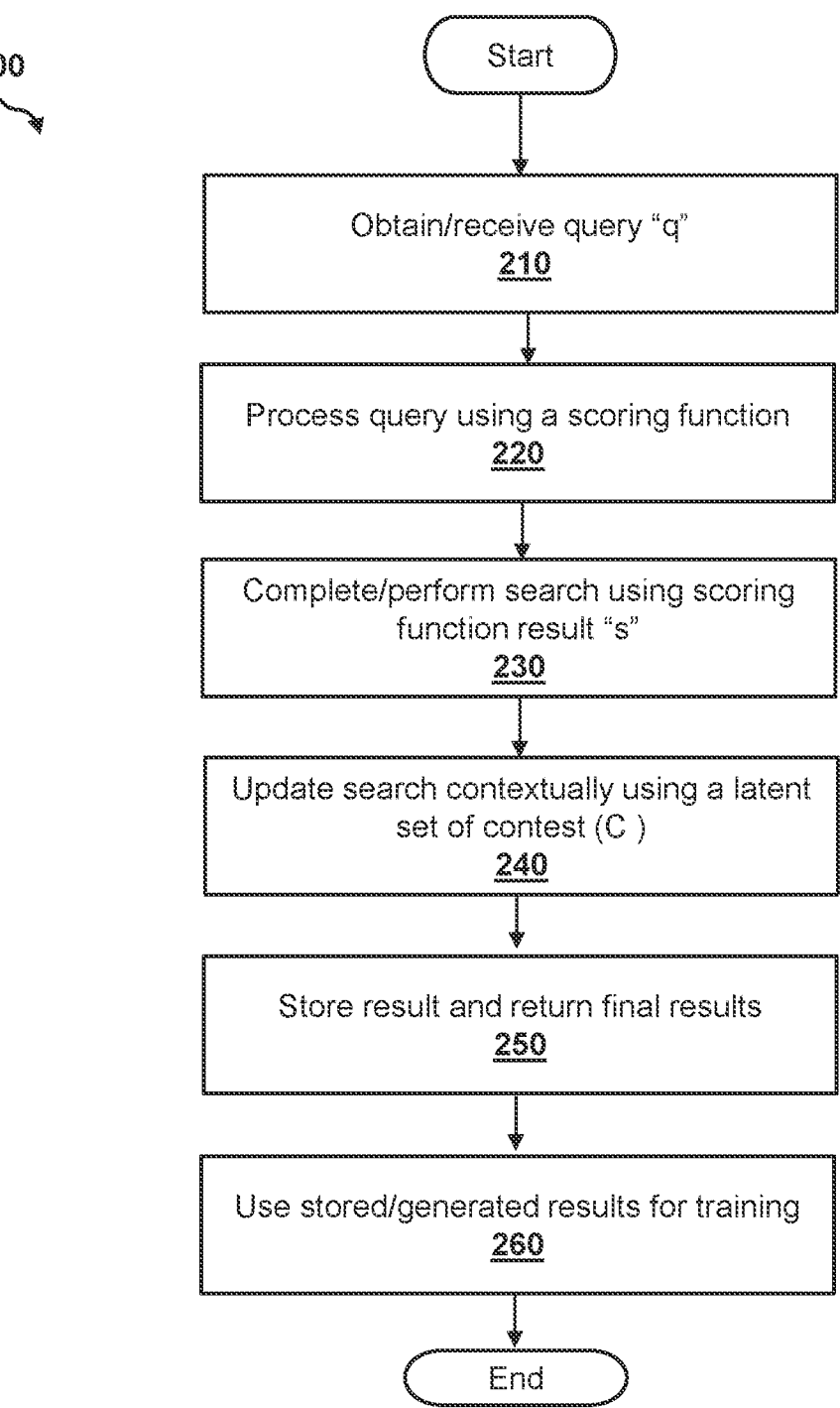
FIG. 2 provides an operational flowchart for providing a context-aware relevancy modelling in a conversational systems, according to one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of providing a context-aware relevancy modelling module (150). In addition to this block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Although, not shown in the illustration of FIG. 1, in one embodiment, the context-aware relevancy modelling module 150 may also include one or more downstream conversion generation modules.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Conversational Artificial Intelligence (AI) systems may be defined as chatbots and virtual assistants/agents that use natural language processing to create humanlike conversational dialogues. They are helpful to users in obtaining information they need by the system responding to user questions and requests through text or audio input without the need for additional human intervention and providing 24 hours availability. Conversational AI systems may be based on a variety of different technologies. One popular technology may be a large language model (LLM).

LLMs are machine learning models that have been trained traditionally on large quantities of text. The text may be unlabeled using self-supervising learning and can perform a variety of natural language processing tasks. Grounding may be necessary in most LLMs. Grounding may be defined as the process of enhancing the LLM with information that is use-case-specific, relevant and not available as part of the LLM treated knowledge. Grounding may be crucial for ensuring quality, relevancy and accuracy. Content grounded systems have certain advantages over parameter only systems.

The content grounded systems have smaller size models and are grounded on content Explain-ability. They also have flexible content and may be easy to maintain customized data and answer tailored on corpus.

By contrast, parameter only models may be huge to store (knowledge bases that are huge) and may be prone to hallucination. Updating content needs retraining. They systems can be costly to train and to maintain customized models (one size fit all answer).

Compared to pure-parameter based models, content-grounded conversational system (CGCS) has several advantages. For instance, grounding on content reduces hallucination, CGCS could be tailored on customized and private content, and can be updated and maintained. In CGCS, content may be selected from a often very large content pool by the relevance to the dialogue, then a generation module continues to generate responses grounding on the selected content.

FIG. 2 is a flowchart depiction of an embodiment having a process 200 for providing a context aware relevancy modeling conversational system. In one embodiment, various information may be obtained outside of a query and/or conversation that can add context to the query. For example, some: 1) Contextual-specific information may include (but not limited to) time of the day, time of the year, geographical, seasonal and periodical, recent events; 2) User-specific, including but not limited to: account status, user profile (interests), favorites, saved; and importantly, rich context information such as past transactions, interaction, previous system logs, previous chats, etc. The amount of external context available could be big, and the conversational system should be able to identify the pieces of context, as well as the content, that may be relevant to the current dialogue.

The process 200 takes advantage of different approaches as can be appreciated by those skilled in the art, while solving the issues of the prior art shortcomings. One challenge currently with designing conversational systems is the amount of external context available. As discussed earlier, there may be other issues compounding this such as noise that can confuse the system and interfere with data integrity. Process 200 provides an optimal way that can help identify the pieces of context as well as the content in a relevant way as obtained from a current dialogue.

Process 200, in one embodiment, provides for a content grounded system that not only selects from a content corpus, but also selects from a large amount of dynamic context information available.

In Step 210, a query "q" may be received or obtained from a source. In one embodiment, this source can be a user or user device. In other embodiments, a third-party device or system can be collecting and providing user queries from one or more users. Information may be then gathered relating to the query. This may include information such as transaction time, current time, user status, category, product information and current and upcoming promotions and user transaction history to be taken into consideration. In one embodiment, the system has access to a given corpus of content D, a set of external contexts Cu.

In Step 220, a first search may be conducted using a scoring function. The scoring function may be selected utilizing a set of latent static contents (hereinafter referenced as d) from a corpus of contents (hereinafter denoted as D) to process the query and start a search.

In another embodiment, the scoring function, can comprise of a fusion function and a relevance function. In one embodiment, the score function may be defined as s(d, C|q) to select the most relevant d and C. The size of D and dynamic nature of Cu make it hard to tackle s (d, C|q) directly. So in one embodiment:

$$s(d, C \mid q) = F(s1(d, C \mid q), s2(d, C \mid q))$$

where $$s1(d, C \mid q) = F_1(s_{dq}(d \mid q), s_{cdq}(C \mid d, q))$$

$$s2(d, C \mid q) = F_2(s_{cq}(C \mid q), s_{dcq}(d \mid C, q))$$

$F_1$ and $F_2$ defines the Fusion Function, while the relevance function is defined by $S_{dq}$, $S_{cdq}$, $S_{cq}$, and $S_{dcq}$.

In Step 230, a first search result may be obtained using the results from Step 220 (the scoring function). In one embodiment, this also includes an inference that may be performed via a greedy search and/or a beam search in directions q to d to C and q to C to d. A greedy search may be defined as an algorithm that finds a solution to the problem in the shortest time possible such as by picking an optimal completion path. In one embodiment, the greedy search and beam search are conducted from both directions: q→d→C and q→C→d. This approach may be adapted and/or combined to find candidates that satisfy the search/query parameters. In one embodiment, this may be followed by a re-ranking of the results of the search (hereinafter denoted as s) to identify the most relevant d and C.

In Step 240, a latent set of context (can also define it under the context of C) may then provided from a set of external contexts (CU) to update and supplement the first search result. This may be content that will be deemed to be most relevant to the query "q" by analyzing both the contest of query and the corpus of content D.

In Step 250, the search results for the query may be finalized and a response to the query may be generated and provided back to the user directly or indirectly. In one embodiment, the response may also be stored and used either immediately or after storage for training purposes (Step 260). In one embodiment the result is generated using a scoring function with latent static content d from a corpus D and said latent set of context C from a set of external contexts CU. The result generated is responsive to a most relevant context-base search said user query q. In one embodiment, the task here is to provide the result given the corpus of content D and a set of external contexts Cu. The results of the query "q" may be formulated from dialog and is selected both from the latent static content d from D and the latent set of context C={c1, . . . , cn} from Cu. This is illustrated in more detail in FIG. 3. The response may be stored and later used to a train an artificial intelligence (AI) engine having one or more machine language models.

In Step 260, the query retrieval is used or retrieved from storage immediately or at a later time to provide training to the AI. The retrieval and selection of results can be used both for training and for inference.

In one embodiment, the training may be provided via a contrastive loss function. In one embodiment, various contrastive loss functions may be used to learn s in end-to-end fashion, or separately learn the components of s. An example of potential loss functions is:

$$L(x, k_+) = -\frac{\exp(s(x, k+)/\tau}{\exp\left(\frac{s(x, k+)}{\tau}\right) + \sum_{i=1}^{K} \exp(s(x, k)/\tau)}$$

The system may be also trained, in one embodiment, in an end-to end stream tasks. In this way, the technique can set up a content grounded system that not only selects from a content corpus, but also selects from large amount of dynamic context information. This technique allows the most relevant content with the help from an associated context, and also uses the available content to help identify the most relevant context. In this manner, the technique work that jointly models the relevance of context and content to the query.in an end-to-end fashion with downstream components.

Figure 3:
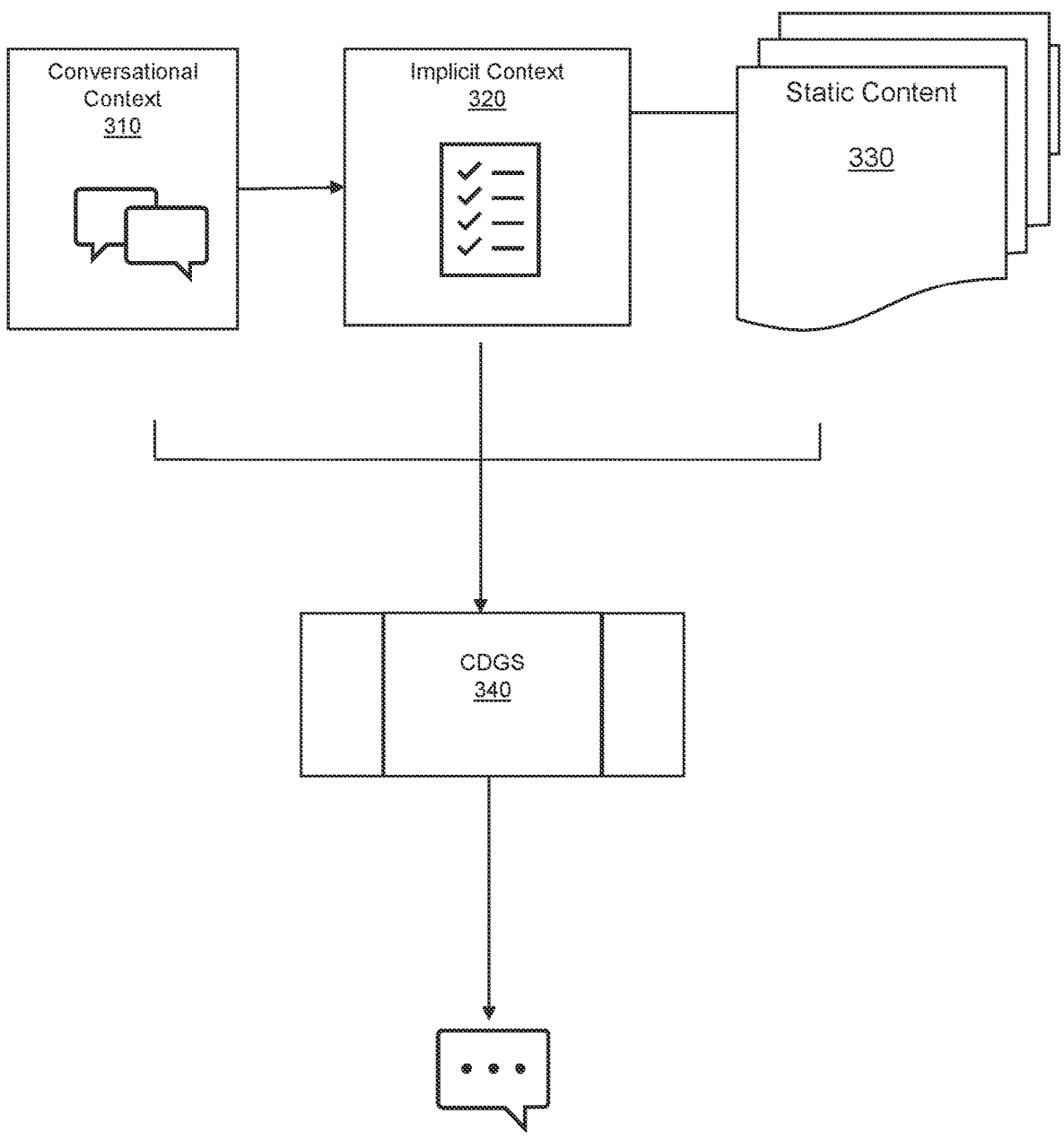
FIG. 3 provides an operational flowchart displaying some of the concepts of FIG. 2 in more detail.

FIG. 3 is a block diagram providing more detail relating to concepts provided in FIG. 2. In one embodiment, FIG. 3 provides an example of information that will be used to obtain and generate the result (and in training). The information considered includes both what may be used as a part of the conversational context 310 and an implicit context 320 as illustrated. This solves some of the challenges and incorporates the context information that may be obtained from outside as well as the current information (contexts and conversations may go unutilized due to lack of implicit context). This information, along with the static content 330 provides the final result 340—a content grounded dialogue system (CDGS).

As discussed, this information such as transaction time, current time, user status, category, product information and current and upcoming promotions and user transaction history to be taken into consideration. The result will provide a dynamic and rich context that boost a user experience. In FIG. 3, the task is, given a corpus of content D, a set of external context Cu, and a query q formulated from a dialogue, to select both:

1. the latent static content d from D,
2. the latent set of context C={c1, . . . , cn} from Cu, The following examples can provide some better understanding. In a first scenario, a prototype is provided of an information seeking bot built on 811 passages of technical support documents. For ease of reference, the examples make references to Lotus Notes (Notes is a registered trademark of IBM Corporation), Cisco (Cisco is registered trademark of Cisco) and Mac/Macbook (Mac and Macbook are registered trademarks of Apple Corporation). A user is trying to access the system but cannot log into it due to an expired password. Only some vague symptoms of the problem is present and the system setting or recent log history shows:

"Modified W3 password time 80 days ago.",
"Mac OS on workstation.",
"Laptop: Macbook Pro 2020.",
"Cisco Secure Client version 5.0.00556",
"AnyConnect VPN America Fast (MacOS).",
"Obtained a license for VM, valid for 2022.",
"Notes client version HCL notes 12.0,1.",
"Notes last log in time: 3 days ago.",
"Notes error message: You must change your password. It expired on 2022/04/01. Do you want to change your password now?", "Notes error message: Server Error: Your account is locked out; see your system administrator to reset it.",
"Attempts failed to reset Notes password.",
"Installed Microsoft Office 365.",
"Upgraded to MacOS Ventura 13.3.1 on 2022/03/30.",
"ID type: functional ID",
"Computer disk usage 95%."

If the system or the user only provides a question on a system not using the current process—the question may appear such as "cannot log into the system. Password expired". In ordinary cases, the response provided back (top content from the corpus may appear something like:

"title": "notes_id_admin_change_passwrod.html.2"
"doc:: |System ID and Password Management|
Note: If you receive a message stating \"You must change your password. It expired o (date). Do you want to change your password now?\ after successfully changing your Notes password, refer to Notes Password Expired Message After Password Change.| Change Notes Password for a Functional ID (FID)| To change the password for a Notes Functional ID (FID), switch from your primary Notes ID to the FID before changing its password. To switch to the FID: Click File, Security, then Switch ID. Select the Notes ID file for the FID, then click Open,. ID files are located in the Data folder.: C:\\notes\\data\\/home/username/lotus/notes/data/us-ers/username/Library/Ap plication Support/HCL Notes data/ (or System data) type the Password for the FID, then click ok. Change the Password for the FD| Change Password on Multiple Computers| If you use System on multiple computers and change your password, the ID file or password must be updated on all computers. This can be done in two ways. Option :change password on all computers"

If the same question was posed "Cannot log into System. Password expired", with all the top content selected, the response provide may appear as:

"title": "reset_password_overview.html.1"
"doc:: \ Reset Your Mac Password\Reset Your Mac PSSORD \ Overview \ The password that you use to log in to your Mac is your mac05 user account password. When you Set Up a Mac for work, you hard disk drive is encrypted using FileValut 2. With this process, your encryption key is sagely stored on servers. If you forget your passowrd or it doesn't work, as part of resetting your password, you request your FilebVault Recovery ey from the Helpdesk to unlock your Mac. Reset Your Mac Password."

With the existing approach of query expansion on "Cannot log into Notes. Password expired.", the top context selected:

"Notes error message: You must change your password. It expired on 2022/04/01. Do you want to change your password now?",
"Notes error message: Server Error: Your account is locked out; see your system administrator to reset it.",
"Attempts failed to reset Notes password.",
In such a case, the top content selected may appear as:
"title": "notes_id_admin_change_passwrod.html.2"
"doc:: |System ID and Password Management|
Note: If you receive a message stating \"You must change your password. It expired o (date). Do you want to change your password now?\ after successfully changing your Notes password, refer to Notes Password Expired Message After Password Change.\ Change Notes Password for a Functional ID (FID)\ To change the password for a Notes Functional ID (FID), switch from your primary Notes ID to the FID before changing its password. To switch to the FID: Click File, Security, then Switch ID. Select the Notes ID file for the FID, then click Open,. ID files are located in the Data folder.: C:notesdataVhome/username/lotus/notes/data/users/ username/Library/Application Support/HCL Notes data\(or System data) type the Password for the FID, then click ok. Change the Password for the FD \ Change Password on Multiple Computers \ If you use System on multiple computers and change your password, the ID file or password must be updated on all computers. This can be done in two ways. Option: change password on all computers"

Instead, using the process 200, from the "Cannot log into Notes. Password expired.", the selection is jointly to the most relevant context:

"System Error Message: Server Error: Your account is locked out; see your system administrator to reset it.", "ID type:functional IS"
},
"title": "notes_id_admin_fid_unlock_id.html.1"
"doc:: \Functional ID (FID) \\Functional FID When you start Notes and receive the message \"Server Error: Your account is locked out; see your system administrator to reset it\" your Notes Functional ID (FID) account is locked. The most common reason is due to an expired Notes FID password. When your Notes FID password has expired, you have a 90 day grace period to change your Notes password. If you do not change your passowrd during the grace period, your Notes FID will be locked. For information on how to unlock your Notes FID, refer to Unlock Notes ID."

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for providing context-aware relevancy modelling in conversational systems, comprising:
   receiving a user query q;
   processing said user query q using a scoring function, wherein said processing include collecting information relating to said user query q from one or more other users;
   selecting a latent static content d from a corpus of content D and a latent set of context C from a set of external context Cu;
   generating a result using said scoring function having said latent static content d from said corpus of content D and said latent set of context C from a set of external contexts CU, wherein said result generated is responsive to a most relevant context-base search to said user query q;
   performing a search using said result;
   generating a response based on the search performed using said result and using said scoring function, in response to said user query q; and formulating from a dialogue extracted from user previous interactions, selecting said latent static content d from the search performed using said corpus of content D.

2. The method of claim 1, wherein the scoring function has a fusion function and a relevance function component.

3. The method of claim 1, wherein said most relevant context-base search includes an inference component.

4. The method of claim 1, wherein an inference is generated via at least one of a greedy search and beam search.

5. The method of claim 4, wherein said beam search is in a direction from q to d to C and a direction from q to C to d, wherein q is the user query and C is latent set of context and d is a latent static content.

6. The method of claim 1, wherein said response is stored.

7. The method of claim 6, wherein said response that is stored is used to train an artificial intelligence (AI) engine having one or more machine language models.

8. The method of claim 7, wherein one or more machine learning models includes a large language model (LLM).

9. The method of claim 1, given said corpus of content D, and said set of latent context C, and said user query q, wherein said latent set of context C={c1, . . . ,cn} from Cu, that that are the most relevant to the query q.

10. A computer system for restoring an interrupted communication session, comprising:
   one or more processors, one or more computer-readable memories and one or more computer-readable storage media;
   program instructions, stored on at least one of one or more of a plurality of storage media for execution by at least one of the one or more processors via at least one of the one or more computer-readable memories, to receive a user query q;
   program instructions, stored on at least one of one or more of a plurality of storage media for execution by at least one of the one or more processors via at least one of the one or more computer-readable memories, to process said user query q using a scoring function, wherein said processing include collecting information relating to said user query q from one or more other users;
   program instructions, stored on at least one of the one or more of said plurality of storage media for execution by at least one of the one or more processors via at least one of the one or more computer-readable memories, to select a latent static content d from a corpus of content D and a latent set of context C from a set of external context Cu;
   program instructions, stored on at least one of the one or more of said plurality of storage media for execution by at least one of the one or more processors via at least one of the one or more computer-readable memories, to generate a result using said scoring function having said latent static content d from said corpus of content D and said latent set of context C from a set of external contexts CU, wherein said result generated is responsive to a most relevant context-base search to said user query q;
   program instructions, stored on at least one of one or more of a plurality of storage media for execution by at least one of the one or more processors via at least one of the one or more computer-readable memories, to perform a search using said result;
   program instructions, stored on at least one of the one or more of said plurality of storage media for execution by at least one of the one or more processors via at least one of the one or more computer-readable memories, to generate a response based on the search performed using said result and using said scoring function, in response to said user query q; and program instructions, stored on at least one of the one or more of said plurality of storage media for execution by at least one of the one or more processors via at least one of the one or more computer-readable memories, to formulate from a dialogue extracted from user previous interactions, selecting said latent static content d from the search performed using said corpus of content D.

11. The computer system of claim 10, wherein the scoring function has a fusion function and a relevance function component.

12. The computer system of claim 10, wherein a search result that is updated includes an inference component.

13. The computer system of claim 10, wherein the most relevant context-base search includes an inference component.

14. The computer system of claim 13, wherein said search is in a direction q to d to C and a direction from q to C to d wherein q is the user query and C is latent set of context and d is a latent static content.

15. The computer system of claim 10, wherein said response is stored.

16. The computer system of claim 15, wherein a stored result is used to train an artificial intelligence (AI) engine having one or more machine language models.

17. The computer system of claim 15, wherein one or more machine learning models includes a large language model (LLM).

18. A computer program product for providing cleansing steps for using a plurality of different transformation assets, the computer program product comprising:

one or more non-transitory computer readable storage media, one or more processors and one or more memories;

program instructions, stored on at least one of one or more of a plurality of storage media for execution by at least one of the one or more processors via at least one of one or more computer-readable memories, to receive a user query q;

program instructions, stored on at least one of one or more of a plurality of storage media for execution by at least one of the one or more processors via at least one of the one or more computer-readable memories, to process said user query q using a scoring function, wherein said processing include collecting information relating to said user query q from one or more other users;

program instructions, stored on at least one of the one or more of said plurality of storage media for execution by at least one of the one or more processors via at least one of the one or more computer-readable memories, to select a latent static content d from a corpus of content D and a latent set of context C from a set of external context Cu;

program instructions, stored on at least one of the one or more of said plurality of storage media for execution by at least one of the one or more processors via at least one of the one or more computer-readable memories, to generate a result using said scoring function having said latent static content d from said corpus of content D and said latent set of context C from a set of external contexts CU, wherein said result generated is responsive to a most relevant context-base search to said user query q;

program instructions, stored on at least one of one or more of a plurality of storage media for execution by at least one of the one or more processors via at least one of the one or more computer-readable memories, to perform a search using said result;

program instructions, stored on at least one of the one or more of said plurality of storage media for execution by at least one of the one or more processors via at least one of the one or more computer-readable memories, to generate a response based on the search performed using said result and using said scoring function, in response to said user query q; and program instructions, stored on at least one of the one or more of said plurality of storage media for execution by at least one of the one or more processors via at least one of the one or more computer-readable memories, to formulate from a dialogue extracted from user previous interactions, selecting said latent static content d from the search performed using said corpus of content D.

19. The computer program product of claim 18, wherein said scoring function has a fusion function and a relevance function component.

20. The computer program product of claim 18, wherein a first search result that is updated includes an inference component and said inference component is generated via at least one of a greedy search and beam search.

* * * * *